(12) United States Patent
Wang et al.

(10) Patent No.: US 7,389,495 B2
(45) Date of Patent: Jun. 17, 2008

(54) FRAMEWORK TO FACILITATE JAVA TESTING IN A SECURITY CONSTRAINED ENVIRONMENT

(75) Inventors: Xiaozhong Wang, Santa Clara, CA (US); Stanislav V. Avzan, Mountain View, CA (US); Andrey Chernyshev, St. Petersburg (RU); Alexey Ushakov, St. Petersburg (RU)

(73) Assignee: Sun Microsystems, Inc., Santa Clara, CA (US)

( * ) Notice: Subject to any disclaimer, the term of this patent is extended or adjusted under 35 U.S.C. 154(b) by 701 days.

(21) Appl. No.: 10/452,664

(22) Filed: May 30, 2003

(65) Prior Publication Data

US 2004/0243881 A1 Dec. 2, 2004

(51) Int. Cl.
G06F 9/44 (2006.01)
H04L 9/00 (2006.01)

(52) U.S. Cl. .............. 717/126; 717/124; 717/127; 726/1

(58) Field of Classification Search .................. None
See application file for complete search history.

(56) References Cited

U.S. PATENT DOCUMENTS

| | | | | |
|---|---|---|---|---|
| 6,158,045 | A * | 12/2000 | You .................. | 717/124 |
| 6,317,868 | B1 * | 11/2001 | Grimm et al. ........... | 717/127 |
| 6,577,982 | B1 * | 6/2003 | Erb ...................... | 702/120 |
| 6,694,459 | B1 * | 2/2004 | Nyman .................. | 714/718 |
| 6,708,173 | B1 * | 3/2004 | Behr et al. ............. | 707/10 |
| 6,779,120 | B1 * | 8/2004 | Valente et al. .......... | 726/1 |
| 7,032,212 | B2 * | 4/2006 | Amir et al. ............. | 717/124 |
| 7,228,566 | B2 * | 6/2007 | Caceres et al. ......... | 726/25 |
| 7,237,236 | B2 * | 6/2007 | Kershenbaum et al. .. | 717/154 |
| 2003/0018909 | A1 * | 1/2003 | Cuomo et al. .......... | 713/200 |
| 2003/0041267 | A1 * | 2/2003 | Fee et al. ............... | 713/201 |
| 2003/0074606 | A1 * | 4/2003 | Boker .................... | 714/42 |
| 2003/0126464 | A1 * | 7/2003 | McDaniel et al. ....... | 713/201 |
| 2003/0145205 | A1 * | 7/2003 | Sarcanin ................ | 713/172 |
| 2004/0107415 | A1 * | 6/2004 | Melamed et al. ....... | 717/124 |
| 2006/0059253 | A1 * | 3/2006 | Goodman et al. ....... | 709/223 |

OTHER PUBLICATIONS

Blackburn, Mark; Chandramouli, Ramaswamy; "Model-based Approach to Security Test Automation", □□URL <www.csrc.nist.gov/auto-func-test/publications/Issre_2002.pdf>, retrieved from scholar.google.com search Jan. 18, 2007.*

Chen, Hao; Wagner, David; "MOPS: an Infrastructure for Examining Security Porperties of Software", p. 235-244, 2002 ACM, retrieved Jan. 18, 2007.*

McDermott, Hohn; Fox, Chris; "Using Abuse Case Models for Security Requirements Analysis", 1999, IEEE, retrieved from scholar.google.com search Jan. 18, 2007.*

Blackburn, Mark R; Busser, Robert; Nauman, Aaron; "Removing Requirement Defects and Automating Test", 2001, Software Productivity Consortium NFP, Inc., retrieved Jan. 18, 2007.*

* cited by examiner

Primary Examiner—Mary Stelman
(74) Attorney, Agent, or Firm—Martine Penilla & Gencarella, LLP

(57) ABSTRACT

A method for testing an implementation of a specification is provided. The method includes providing a security manager capable of being configured to test compliance of an implementation of a specification, and installing the security manager. The method further includes constructing a security policy corresponding to a desired security environment that a test requires. The method also includes executing the test with the security manager using the security policy.

10 Claims, 8 Drawing Sheets

FRAMEWORK TO FACILITATE JAVA TESTING IN A SECURITY CONSTRAINED ENVIRONMENT

BACKGROUND OF THE INVENTION

1. Field of the Invention

The present invention relates to data transmission, and more particularly, to the testing of a JAVA™(Java) technology implementation to determine compliance with the Java specification.

2. Description of the Related Art

Currently, Java environments can be categorized into various Java technologies. A Java technology is defined as a Java specification and its reference implementation. Examples of Java technologies are Java 2 Standard Edition (J2SE), Java 2 Enterprise Edition (J2EE), Java 2 Micro Edition (J2ME), and Mobile Information Device Profile (MIDP). As with most other types of Java software, a new Java technology should be tested to assure consistency across multiple platforms. This testing is generally performed using compatibility testing.

Compatibility testing refers to the methods used to test an implementation of a Java technology specification in order to assure consistency across multiple hardware platforms, operating systems, and other implementations of the same Java technology specification. When this assurance is accomplished by means of a formal process, application developers can then be confident that an application will run in a consistent manner across all tested implementations of the same Java technology specification. This consistent specification-based behavior is a primary function of compatibility testing.

Compatibility testing differs from traditional product testing in a number of ways. Unlike product testing, compatibility testing is not primarily concerned with robustness, performance, or ease of use. The primary purpose of Java compatibility testing is to determine whether an implementation of a technology is compliant with the specification of that technology.

Compatibility test development for a given feature relies on a complete specification and reference implementation for that feature. Compatibility testing is a means of ensuring correctness, completeness, and consistency across all implementations of a technology specification that are developed. The primary goal of compatibility testing is to provide the assurance that an application will run in a consistent manner across all tested implementations of a technology.

To determine if the implementation of a particular Java technology is compliant with the specification for the particular Java technology, technology compatibility kits (TCK) may be used. A TCK is a suite of tests, tools, and documentation that allows an implementor of a Java technology specification to determine if the implementation is compliant with the specification.

A TCK typically includes a Test Harness, defined as the applications and tools that are used for test execution and test suite management, and a TCK Test Suite, which is the composite of the actual test cases in a TCK that are executed to test an implementation. A TCK can also include documentation that includes the specific TCK usage procedures, and the compatibility testing requirements that apply to the related technology release (usually in the form of a TCK user's guide). Also, a description of the TCK appeals process can be included, as well as an audit process, which is used to better ensure the integrity of a consistent self-testing compatibility program.

As mentioned above, a TCK usually includes a TCK test suite, which is a set of tests designed to verify that an implementation of a Java technology complies with the appropriate specification. Each test in a TCK test suite is composed of one or more test cases that are designated by a test description. A test case is the source code and accompanying information designed to exercise one aspect of a specified assertion. Accompanying information may include test documentation, auxiliary data files and other resources used by the source code. Some tests in the TCK test whether proper security checking is done before an operation is conducted according to the Java specification. Those tests insure that an operation can be successfully completed given enough permissions and some operations will fail by throwing security exceptions if not enough permissions are granted.

Unfortunately, the prior art handles security constraints in inconsistent ways in TCK tests. In a first prior art approach, a test lets the implementation throw security exceptions without catching them. This typically leads to test failures and generally forces the security constraints to be removed in order to pass the tests.

In second prior art approach, a test tries to install a security manager that grants the required permissions. If that fails, the test simply returns as if it is passed. Unfortunately, this approach does not take into account the possibility that the existing security manager may actually grant the required permissions, even if the desired security manager cannot be installed. Removal of a test-installed security manager may be easily forgotten thereby leading to a changed executing environment for other remaining tests. Also, different tests may install different security managers. If multiple tests are executed currently, one test may run with the security manager installed by another test. Code redundancy and duplication can arise if each test tries to install and remove a security manager and execute the security managers in a synchronized manner.

In a third prior art approach, a test catches the security exceptions as thrown in the first prior art example and checks whether the installed security manager actually grants the required permissions. If it does not, then the security exception is expected. Otherwise the security exception should not be thrown and the test returns as failed. This approach does not take into account that a security manager that grants the required permissions may be installed by the test as in the second prior art approach.

In view of the foregoing, there is a need for a more efficient and intelligent method of testing whether a Java technology implementation is compliant with the Java technology specification.

SUMMARY OF THE INVENTION

A method for utilizing a testing library to assess Java specification compliance is provided. The method includes using multiple tests for a variety of circumstances to provide an accurate assessment of Java specification compliance without the problems of the prior art.

In one embodiment, a method for testing an implementation of a programming language is provided. The method includes providing a security manager capable of being configured to test compliance of an implementation of a programming language specification, and installing the security manager. The method further includes constructing a security policy corresponding to a desired security environment that a test requires. The method also includes executing the test with the security manager using the security policy.

In another embodiment, a method for testing an implementation of a specification is provided. The method includes providing a class capable of being configured to vary an environment of an implementation of a specification, and installing the class. The method further includes configuring the class corresponding to the environment that a test requires. The method also includes executing the test with the class, and restoring an original environment after execution of the test.

In yet another embodiment, a method for testing an implementation of a programming language is provided. The method includes providing a test to a framework where the test being capable of determining whether an implementation complies with a programming language specification. The method further includes running the test positively and negatively by changing a test environment without modifying the test.

The advantages of the present invention are numerous. Most notably by using a library of tests including a positive test and a negative test as described herein to assess a Java technology implementation's compliance with the Java specification, tests may be run in an accurate and dependable manner without the problems of the prior art. Therefore, by using the library of tests described herein, the Java application being tested can be certified as being Java compliant in an intelligent, coherent, and accurate fashion. As a result, Java technology implementation test results may be more reliable and therefore can enable greater dependability as to Java compliance.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings.

DETAILED DESCRIPTION OF THE PREFERRED EMBODIMENTS

Figure 1:
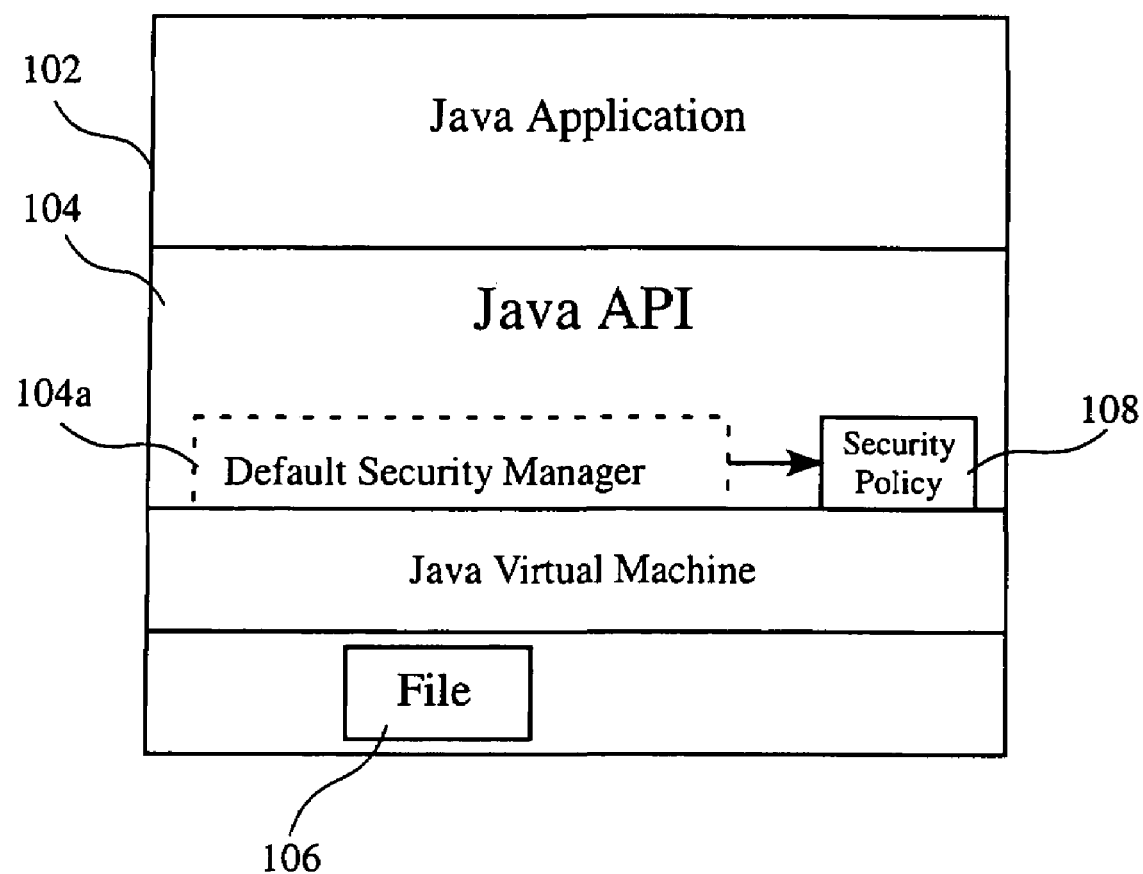
FIG. 1 illustrates a block diagram showing a Java specification compliance system in accordance with one embodiment of the present invention.

An invention is disclosed for using a library of tests for determining an implementation's compliance with the Java specification. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

In general terms, the library of tests may be parts of a test suite such as, in one embodiment, a framework called a security test runner from Sun Microsystems in Santa Clara, Calif. In one exemplary embodiment, a framework may be a library that provides utilities to be used by other programs. In one embodiment, a security manager consults a security policy for both positive and negative tests. The security manager is a class that has methods to cope with problems where protection of the environment of the host may be compromised during execution of instantiated classes in runtime. In one embodiment, the security manager can consult the security policy and may utilize API provided by the default security manager. In this way, the new security manager can handle different ProtectionDomains in different ways according to the security policy. Additionally, the methodology described herein can also handle privileged code block.

The framework includes a security manager that is needed to provide a more precise testing. The framework also uses existing security managers in cases where a specialized security manager cannot be installed. The framework further synchronizes security tests so that only one test is using the framework at any one time. In one embodiment, the security test runner is utilized which overcomes challenges in writing security related tests by providing a utility to install a security manager and remove it after test runs. If the security manager cannot be installed, an existing security manager is used if it satisfies the requirements of a particular test as described herein. The security test runner can also provide synchronization of installed security managers and testing runs.

With respect to the relationship between the security manager and the Java API, the application makes a request of the Java API to perform an operation. The Java API asks the security manager if such an operation is allowable. If the security manager does not want to permit the operation, it throws an exception. Otherwise, the Java API completes the operation and returns normally.

In one example, two types of test may be used such a positive test and a negative test. A positive test as used herein tests the normal behavior of the API under the condition that all the required permissions are granted. A negative test as used herein expects security exceptions to be thrown under the condition that at least one of the required permissions is not granted.

In one embodiment, a security manager is installed that consults a security policy. Then a new security policy may be used to replace any one that may have been installed. For a positive test, the new security policy grants only required permissions to tests code source and grants the default permissions to other code sources.

Default permissions here means permissions granted by the original Policy that has been replaced. For a negative test, this policy grants permissions other than the required permissions to the tests code source, and default permissions to other code sources. If the new security manager cannot be installed due to security reasons, the current security manager is checked to see if it fit the needs and requirements of the test and runs the test under the current (or pre-existing) security manager if the requirements are met.

Once invoked, the security runner may install a security manager that grants/denies certain security permissions as required by the test(s) utilized. If the installation is successful, the test will be normally executed. If the installation of the security manager fails, it indicates that there is already a security manager installed. In this case, the framework will check whether the current security manager can satisfy the test's security needs. This may be done, in one embodiment, by using the checkPermission or JDK 1.1 style check methods of the current security manager. If the security manager satisfies the needs, the test can be normally executed with it. Otherwise the test will not be able to be normally executed.

The security test runner can be accessed via public methods that are all synchronized, which means that no more than one test can use the framework at the same time. This prevents the problems associated with race conditions which can occur when more than one test is being run at the same time.

Using this type of framework, tests do not need to deal with the security constraints itself. All it needs to do is to invoke the framework with necessary parameters. This ensures a consistent handling of security constraints and eliminates a lot of code duplication and redundancy. It should be appreciated that the framework may be easily adapted to any Java testing involved with the executing of one or more tests, possibly in a concurrent fashion, in a security constrained environment.

FIG. 1 illustrates a block diagram showing a Java specification compliance system in accordance with one embodiment of the present invention. In this embodiment, a Java application opens a file 106 through a Java application programming interface (API) 104. The Java API is typically a method prescribed by a computer operating system or by an application program by which an application program can make requests of the operating system or another application. In one embodiment, the Java API is a part of a Java runtime environment. In one embodiment, the Java application makes a request of the Java API to perform an operation. The Java API then asks the security manager if such an operation is allowable. If the security manager is a default security manager, it checks the security policy 108 to see if the operation is allowed. In one embodiment, the security policy includes policies for use by the security manager for testing the Java API to determine whether the API conforms with Java specification. If the security manager does not want to permit the operation, it throws a security exception and otherwise the Java API completes the operation and returns normally. Therefore, in one embodiment, if the Java application requests to open file then the Java API in response asks the security manager to check the policy file to see if permission is given for the file open operation. The security manager returns a response to the Java API. If the response is a yes then the Java API may move forward with the requested operation which, in one embodiment would be to allow access to the file. If the response is a no, an exception is thrown and API access to the file is denied.

In one embodiment, a positive test and a negative test are utilized in the security test runner framework to determine if a certain operation is allowable. It should be appreciated that any suitable type of test may be utilized as the positive test and the negative test that are consistent with the methodology described herein. In one embodiment, the API for the positive test implements an interface such as, for example, SecurityTestRunner.RT( ). The SecurityTestRunner.RT( ) puts the test code in the method such as, for example, public Status run( ). An exemplary Java API for the positive test is shown in Table 1:

TABLE 1 public synchronized static Status runTestwithPermissions(RT method,
    Permissions perms,
    PrintWriter ref,
    Boolean useOldSModel)
Parameters:
  method - test code (should implement RT.run( )).
  perms - actual permissions that are required to run the test.
  ref - log of diagnostic messages.
  useOldSModel - true if tested API invokes security manager's JDK 1.1 style
method, e.g. checkConnect( ), checkListen( ).
Returns:
  result of the execution of the specified test code.

To run a positive test or a negative test, the security manager consults with a security policy. In one embodiment, for a positive test, the security policy grants only required permissions to tests and grants the default permissions to other code source. In one embodiment, for a negative test, the security policy grants permissions other than the required permissions to the test, and default permissions to other code sources.

In one embodiment, the API for the negative test implements the interface SecurityTestRunner.RT( ). The SecurityTestRunner.RT( ) puts the test code in the method public Status run( ). The negative test assumes that related permissions are not granted and returned "passed" status on catching Security Exception. The negative test also constructs a permissions object that contains permissions not to be granted. The negative test calls runTestWithout Permissions( ) method in SecurityTestRunner. An exemplary Java API for negative test is shown in Table 2:

TABLE 2 public synchronized static Status
runTestwithWithoutPermissions(SecurityTestRunner.RT method,
    java.security.Permissions perms,
    java.io.PrintWriter ref,
    Boolean useOldSModel)
Parameters:
  method - test code (should implement RT.run( )).
  perms - actual permissions that are required to run the test.
  ref -log of diagnostic messages.
  useOldSModel - true if tested API invokes security manager's JDK 1.1 style
method, e.g. checkConnect( ), checkListen( ).
Returns:
  result of the execution of the specified test code.

Another API may be added for the convenience of test writers. This API takes a test implementing RT and runs the test twice, first positively and then negatively. This API may be added because in most cases, the test itself is essentially the same for both positive and negative tests. Therefore, instead of writing two tests, only one test need be written. Such an exemplary API is shown below in Table 3:

TABLE 3 public synchronized static Status runTest(RT method,
Permissions perms,
PrintWriter ref,
Boolean useOldSModel)

In one embodiment, security policy objects are constructed based on permissions. In such an embodiment, permissions passed to positive and negative API will be used to construct the security policy object.

Figure 2:
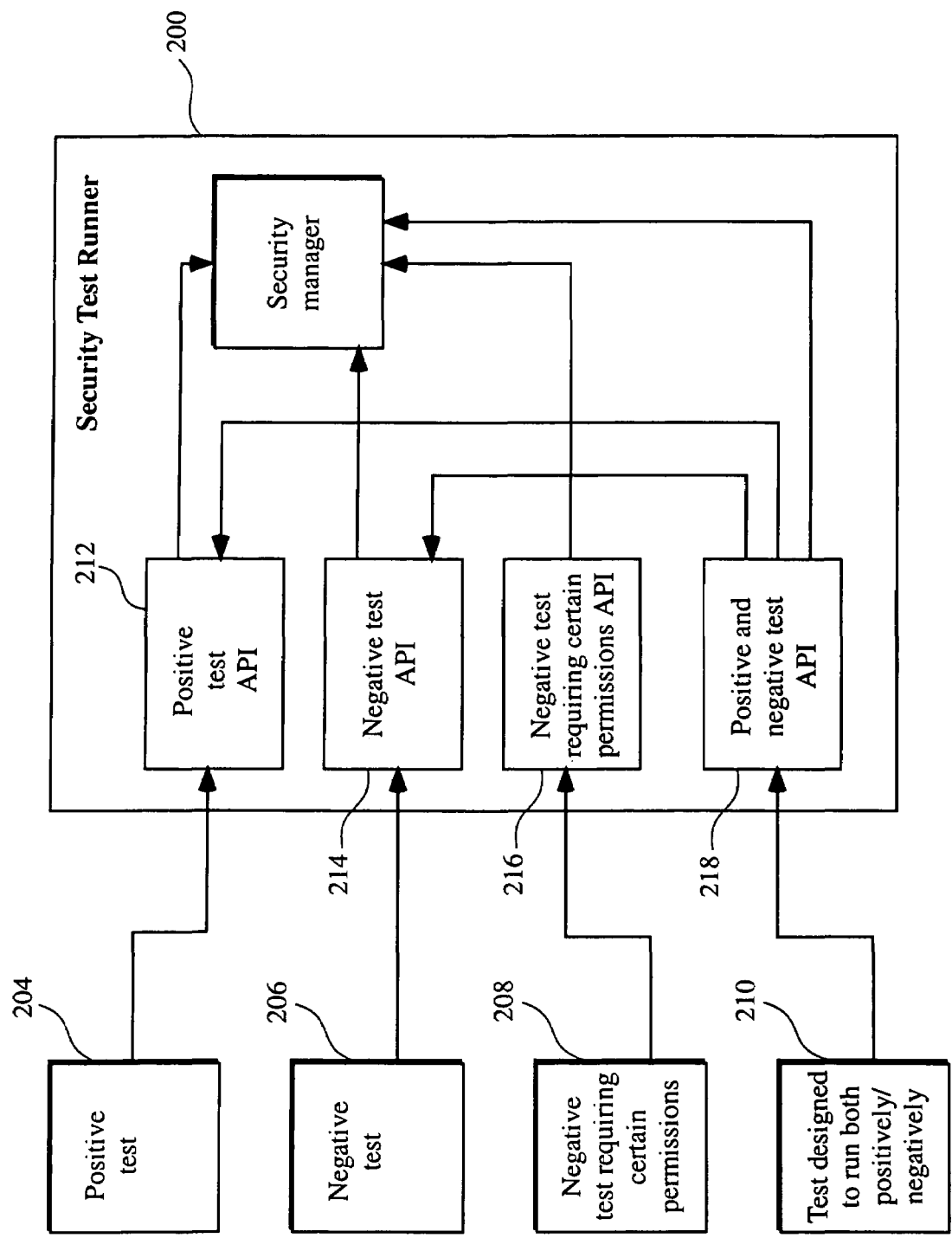
FIG. 2 shows a diagram illustrating a security test runner framework in accordance with one embodiment of the present invention.

FIG. 2 shows a diagram illustrating a security test runner framework 200 in accordance with one embodiment of the present invention. In one embodiment, to be able to use the SecurityTestRunner framework, a test code is placed into the clause shown in Table 4:

TABLE 4

SecurityTestRunner.RT method = new SecurityTestRunner.RT( ) {
    public Status run( ) {
        ...
        // put here your test code
        ...
    }
};

In one embodiment, the security test runner framework also provides a positive test, a negative test, a negative test requiring certain permissions, and an access test. In one embodiment, the security test runner framework never catches a security exception in a positive test and always catches a security exception in a negative test.

In one embodiment, a test such as, for example, a positive test 204, a negative test 206, a negative test requiring certain permissions 208, and a test designed to run both positively/negatively 210 may utilize a security test runner framework 200 to determine if an implementation of a Java API is Java specification compliant. In one embodiment, the framework 200 may be a security test runner that can run any suitable numbers and types of tests. In one embodiment, the security test runner framework 200 includes the security manager 104a capable of being configured using a particular security policy to run the positive test 204, the negative test 206, the negative test requiring certain permissions 208, and the test designed to run both positively/negatively 210.

In one embodiment, the positive test 204 invokes a positive test API 212 within the security test runner framework 200. The positive test API 212 in turn installs a security manager and the positive API 212 also constructs and installs a security policy object corresponding to that test. For a positive test, the new security policy grants only required permissions to tests code source and grants the default permissions to other code sources. The installed security manager may then consults the security policy. A complete operation flow of the positive test is described in further detail in reference to FIG. 4.

In one exemplary embodiment, the negative test 206 invokes a negative test API 214 within the security test runner framework 200. The negative test API 214 in turn installs a security manager and the negative API 214 also constructs and installs a security policy object corresponding to that test. For a negative test, this policy grants permissions other than the required permissions to the tests code source and default permissions to other code sources. The installed security manager may then consult the security policy. A complete operation flow of the negative test is described in further detail in reference to FIG. 5.

In another exemplary embodiment, the negative test requiring certain permissions 208 invokes a negative test requiring permission API 216 within the security test runner framework 200. The negative test requiring certain permissions API 216 in turn installs a security manager and the negative test requiring certain permissions API 216 also constructs and installs the same security policy object as a negative test does. The installed security manager may then consult the security policy. A complete operation flow of the negative test requiring certain permissions is described in further detail in reference to FIG. 8.

In yet another exemplary embodiment, the test designed to run both positively and negatively 210 invokes a positive and negative test API 218 within the security test runner framework 200. The positive and negative test API 218 invokes the positive test API 212 and the negative test API 214 one by one.

In one embodiment, the security test runner framework 200 is generated using the Java language and executed on a Java virtual machine. A Java virtual machine is used as an interpreter to provide portability to Java applications. In general, developers design Java applications as hardware independent software modules, which are executed Java virtual machines. The Java virtual machine layer is developed to operate in conjunction with the native operating system of the particular hardware on which the mobile multimedia framework system is to run. In this manner, Java applications can be ported from one hardware device to another without requiring updating of the application code.

Unlike most programming languages, in which a program is compiled into machine-dependent, executable program code, Java classes are compiled into machine independent byte-code class files which are executed by a machine-dependent virtual machine. The virtual machine provides a level of abstraction between the machine independence of the byte-code classes and the machine-dependent instruction set of the underlying computer hardware. A class loader is responsible for loading the byte-code class files as needed, and an interpreter or just-in-time compiler provides for the transformation of byte-codes into machine code.

More specifically, Java is a programming language designed to generate applications that can run on all hardware platforms, small, medium and large, without modification. Developed by Sun, Java has been promoted and geared heavily for the Web, both for public Web sites and intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "bytecode". The bytecode is then converted (interpreted) into machine code at runtime. Upon finding a Java applet, the Web browser invokes a Java interpreter (Java Virtual Machine), which translates the bytecode into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result. Although the present invention is described based on the Java programming language, other programming languages may be used to implement the embodiments of the present invention, such as other object oriented programming languages.

In an exemplary embodiment, the positive test 204 for a security constrained method may be what is shown in Table 5:

TABLE 5

```
Permissions permission = new Permissions ( );
permissions.add( . . . // permission requested by an API tested);
SecurityTestRunner.RT method = new SecurityTestRunner.RT( ) {
    public status run ( ) {
        . . .
        // your test code
        . . .
    }
};
return SecurityTestRunner.runTestWithPermissions(method,
permissions, ref, true);
```

This will make an attempt to execute the outlined testing code in the relaxed security environment. The first boolean flag (useOldModel) may be set depending on which security model the method behavior is based. The last boolean flag (runPositiveOnly) must be set to true.

In an exemplary embodiment, a negative test for a security constrained method is shown in Table 6:

TABLE 6

```
Permissions permissions = new Permissions ( );
permissions add( . . . // permission requested by an API tested);
SecurityTestRunner.RT method = new SecurityTestRunner.RT( ) {
    public status run( ) {
        try {
            . . .
            // call you security constrained API here
            . . .
            return Status.failed ("SecurityException expected");
        } catch (SecurityException e) {
            return Status.passed ("OKAY");
        }
    }
};
return SecurityTestRunner.runTestWithoutPermissions (method,
permissions, ref, true);
```

This makes an attempt to execute the outlined testing code in the constrained security environment where the specified permissions are denied. In one embodiment, the boolean flag (useOldModel) may be set depending on which security model the method behavior is based.

Figure 3:
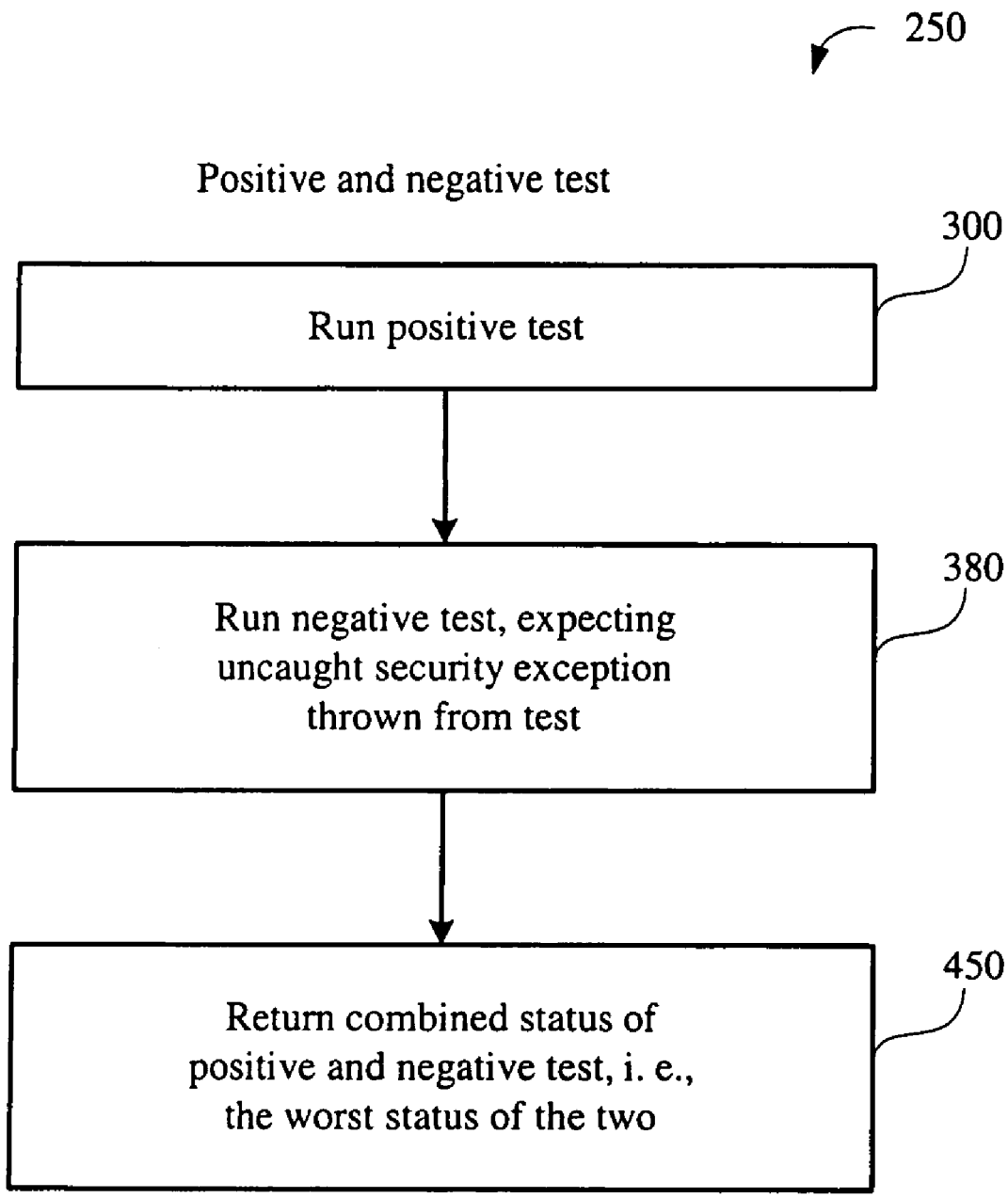
FIG. 3 shows a flowchart that illustrates testing in accordance with one embodiment of the present invention.

FIG. 3 shows a flowchart 250 that illustrates testing in accordance with one embodiment of the present invention. It should be understood that the processes depicted in the flowchart 250 as well as the flowcharts in the other figures herein may be in a program instruction form written on any type of computer readable media. For instance, the program instructions can be in the form of software code developed using any suitable type of programming language. For completeness, the process flow of FIG. 3 will illustrate an exemplary process whereby a test is conducted to determine an application's compliance with a particular specification such as, for example, a Java specification. It should be appreciated any suitable methodology to test an implementation may be utilized that are consistent with the methodology consistent with the operations described herein. Although in this exemplary embodiment, the positive test is conducted before the negative, it should be understood that the methodology described herein may be used so the negative test is conducted before the positive. In another embodiment, the positive test or a negative test without the other may be utilized.

In one embodiment, the method begins with operation 300 which runs a positive test. Operation 300 is discussed in further detail in reference to FIG. 4. After operation 300, the method moves to operation 380 which runs a negative test. Operation 380 is described in further detail in reference to FIG. 5. After operation 380, the method moves to operation 450 which returns combined status of positive test and negative test, i.e., the worst status of the two. In this operation, the method examines the results of the positive test and the negative test and determines if either test failed.

Figure 4:
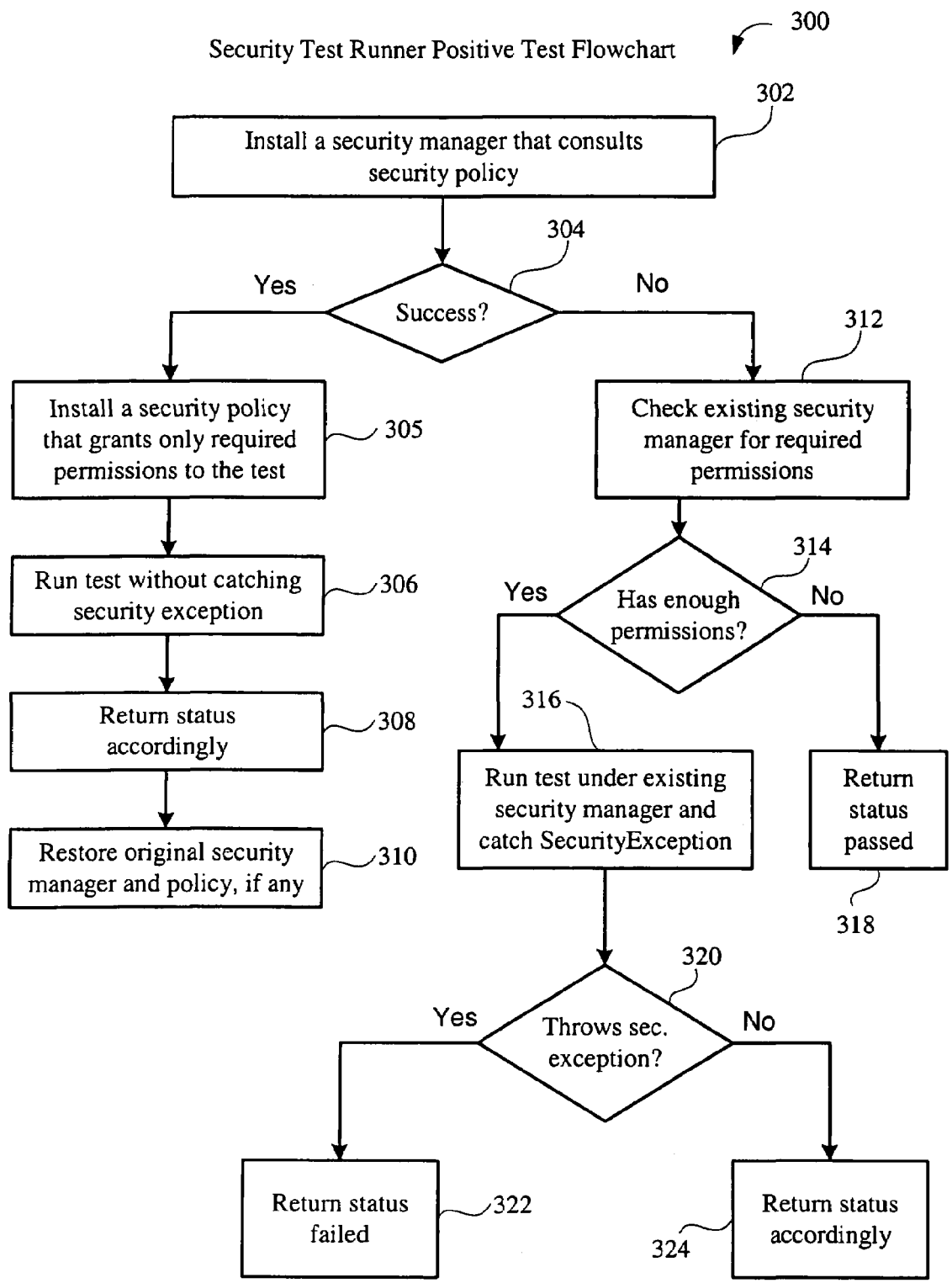
FIG. 4 illustrates a flowchart which defines a positive test in accordance with one embodiment of the present invention.

FIG. 4 illustrates a flowchart 300 which defines a positive test in accordance with one embodiment of the present invention. In one embodiment, the flowchart 300 begins with operation 302 which installs a security manager (SM) that consults a security policy.

After operation 302, the method moves to operation 304 which determines if the installation of the security manager was successful. If operation 304 determines that the installation was successful, the method moves to operation 305 where a security policy that grants only required permissions to the test is installed. After operation 305, the method moves to 306 which runs the test without catching security exception. In one embodiment, the security manager that has been installed runs the tests with the security policy that was installed in operation 305. The test does not catch security exception. Any security exception thrown will be caught by a test harness. The test harness will fail the whole test as the security exception is unexpected to it.

After operation 306, the method advances to operation 308 which returns status accordingly. Then the method proceeds to operation 310 where the original security manager and policy, if any is restored.

If operation 304 determines that the security manager was not installed, the method moves to operation 312 where existing security manager is checked for required permissions. After operation 312, the method advances to operation 314 which determines if the existing security manager has enough permissions. If operation 314 determines that there are enough permissions, the method moves to operation 316 which runs a test under the existing security manager and catches a security exception. After operation 316, the method proceeds to operation 320 which determines if a security exception is to be thrown. If operation 320 determines that the security exception has been thrown from the test, the method moves to operation 322 which returns status failed. If operation 320 determines that the security exception has not been thrown, the method advances to operation 324 where status is returned accordingly. If operation 314 determines that there are not enough permissions granted by the existing security manager, the method moves to operation 318 where status passed is returned.

Figure 5:
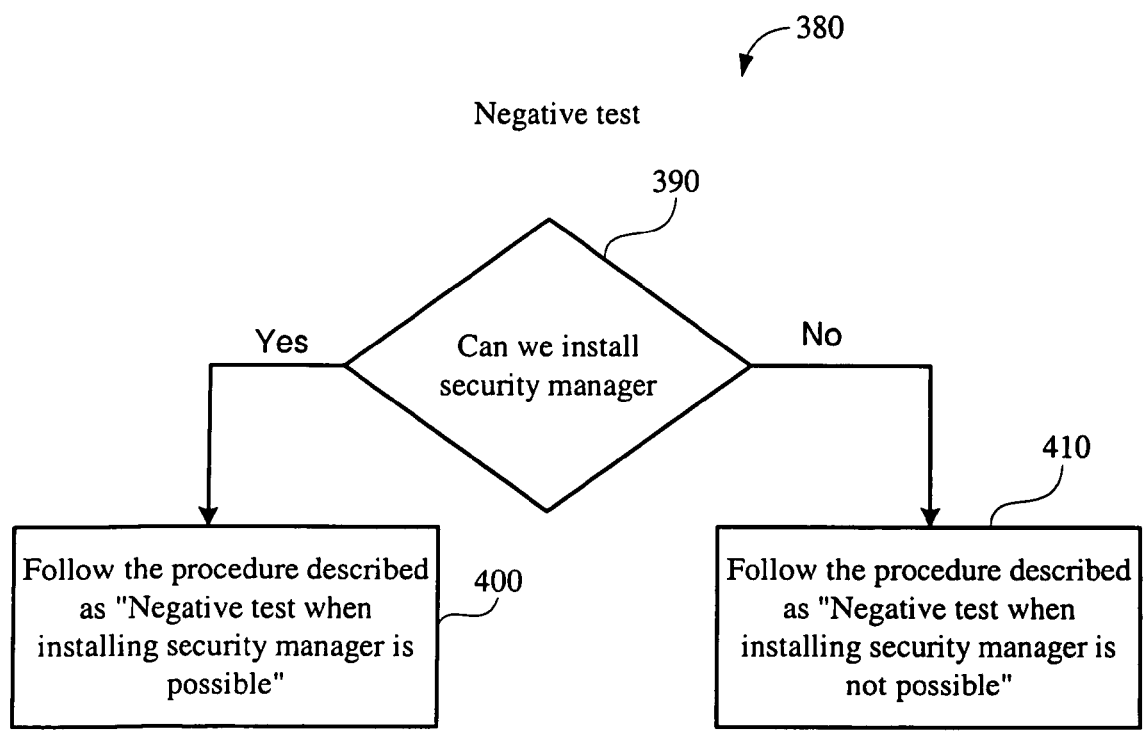
FIG. 5 illustrates a flowchart defining a negative test in accordance with one embodiment of the present invention.

FIG. 5 illustrates a flowchart 380 defining a negative test in accordance with one embodiment of the present invention. The flowchart 380 begins with operation 390 which determines if a security manager can be installed. If the security manager can be installed, then the method moves to operation 400 which follows the procedure described as "Negative test when installing security manager is possible" which, in one embodiment, are operations embodied in the flowchart as described in reference to FIG. 7. If the security manager cannot be installed then the method moves to operation 410 which follows the procedure described as "Negative test when installing security manager is not possible" which, in one embodiment, are operations embodied in the flowchart as described in reference to FIG. 6.

Figure 6:
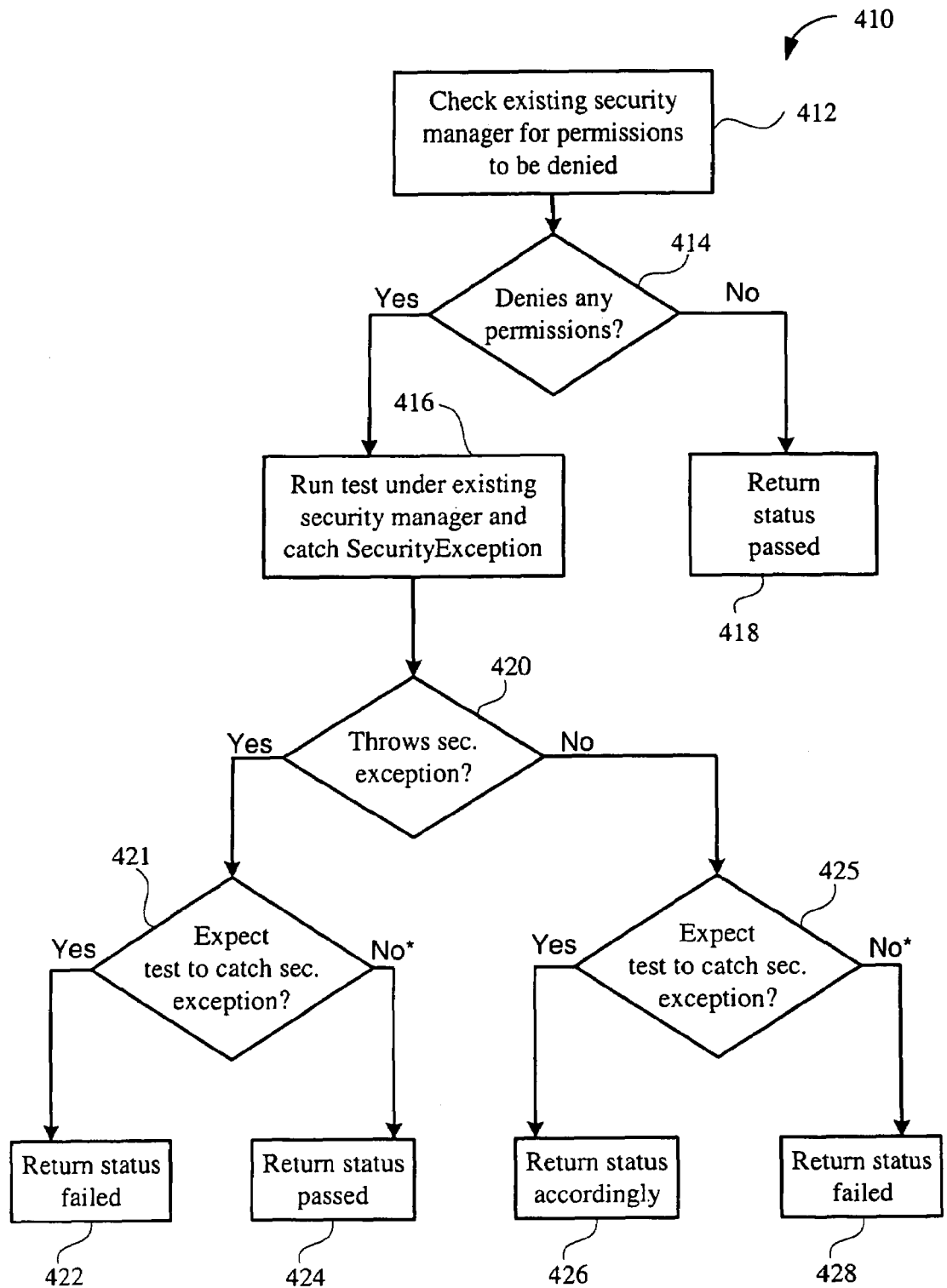
FIG. 6 shows a flowchart which defines a negative test when installing security manager is not possible in accordance with one embodiment of the present invention.

FIG. 6 shows a flowchart 410 which defines a negative test when installing security manager is not possible in accordance with one embodiment of the present invention. In one embodiment, the method begins with operation 412 where an existing security manager is checked for permissions to be denied. After operation 412, the method proceeds to operation 414 which determines whether any permissions are denied. If any permissions are denied, the method moves to operation 416 where a test under the existing security manager is run and security exception is caught. Then the method moves to operation 420 which determines if a security exception is thrown. If a security exception is thrown, the method moves to operation 421 which determines if the test, as opposed to the framework, is expected to catch the security exception. If the security exception is expected as determined by operation 421, the method advances to operation 422 where status failed is returned. If the security exception is not expected, the method proceeds to operation 424 where status passed is returned.

If the security exception not thrown was determined by operation 420, the method advances to operation 425 which determines if the test, as opposed to the framework, is expected to catch the security exception. If the security exception is expected to be caught as determined by operation 425, the method moves to operation 426 which returns status accordingly. If the security exception is not expected to be caught as determined by operation 425, the method advances to operation 428 which returns status failed. If operation 414 determines that any permission is not to be denied, the method advances to operation 418 which returns passed status. It is noted that the option of determining that the security exception is not expected to be caught by the test is available only internally to other APIs in the framework as illustrated by "No*" in FIG. 6.

Figure 7:
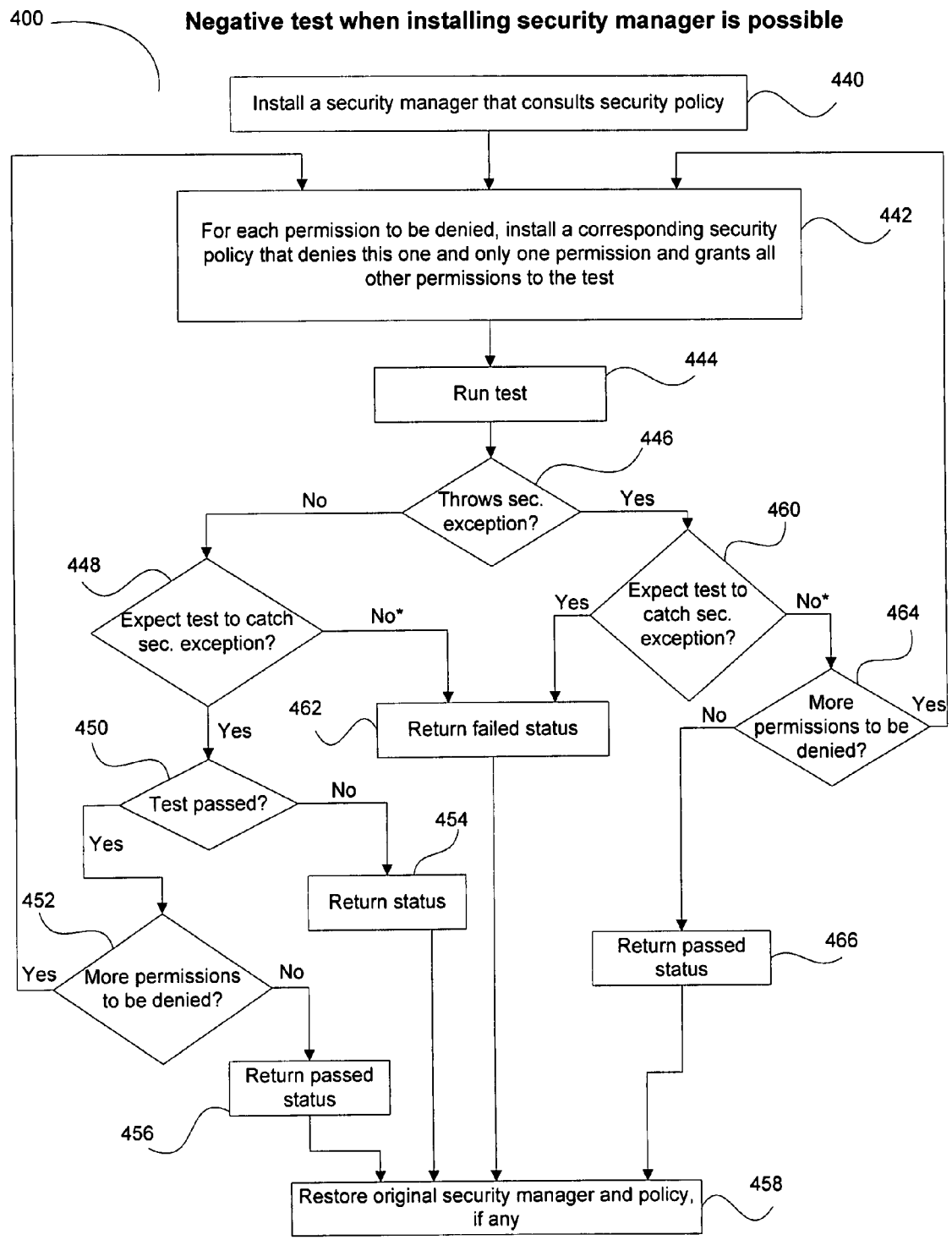
FIG. 7 shows a flowchart which defines a negative test when installing security manager is possible in accordance with one embodiment of the present invention.

FIG. 7 shows a flowchart 400 which defines a negative test when installing security manager is possible in accordance with one embodiment of the present invention. In one embodiment, the method begins with operation 440 which installs a security manager that consults a security policy. After operation 440, the method advances to operation 442 where, for each permission to be denied, operation 442 installs a corresponding security policy that denies the one and only one permission and grants all other permissions to the test. Then the method advances to operation 444 where the test is run. Then the method moves to operation 446 which determines if a security exception is thrown. If the security exception is not thrown, the method proceeds to operation 448 which determines if the test, as opposed to the framework, is expected to catch the security exception. If the test was expected to catch the security exception, the method moves to operation 450 which determines if the test was passed. If the test was passed, the method proceeds to operation 452 which determines if more permissions are to be denied. If more permissions are to be denied, the method returns to operation 442. If more permissions are not to be denied, the method advances to operation 456 which returns passed status. After operation 452, the method advances to operation 456 where the original security manager and policy, if any, are restored.

If the test was not passed as determined by operation 450, the method moves to operation 454 which returns status. After operation 454, the method moves to operation 458. If operation 448 determines that the test is not expected to catch the security exception, the method advances to operation 462 which returns failed status. After operation 462, the method moves to operation 458.

If operation 446 determines that a security exception is thrown, the method advances to operation 460 which determines if the test is expected to catch the security exception. If operation. 460 determines that the test is expected to catch the security exception, the method moves to operation 462. If operation 460 determines that the test is not expected to catch the security exception, the method proceeds to operation 464 which determines if more permissions are to be denied. If more permissions are to be denied as determined by operation 464, the method returns to operation 442. If operation 464 determines that more permissions are not to be denied, the method advances to operation 466 which returns passed status. After operation 466, the method moves to operation 458. It is noted that the option of determining that the test is not expected to catch the security exception is available only internally to other APIs in the framework as illustrated by "No*" in FIG. 7.

Figure 8:
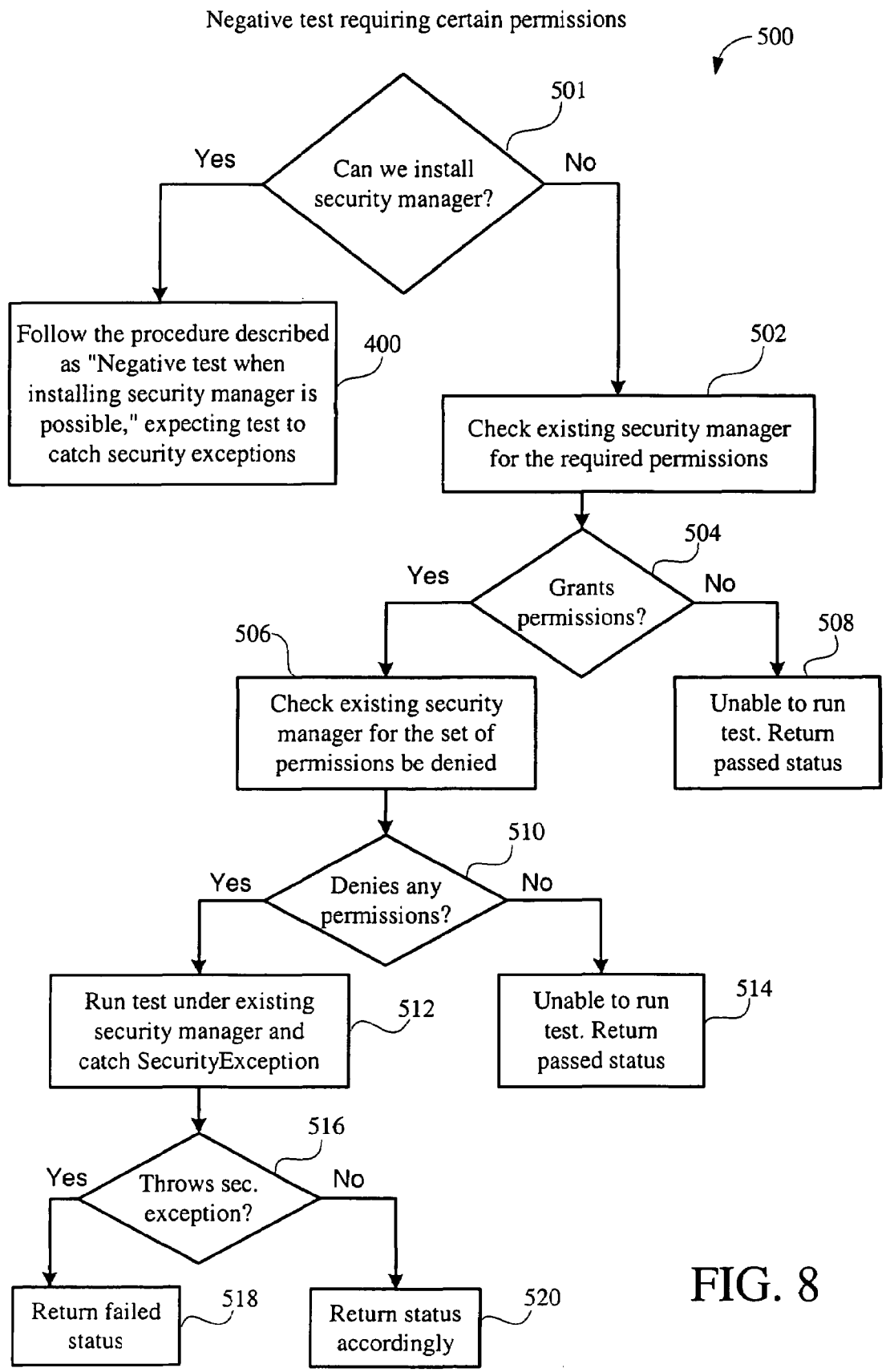
FIG. 8 illustrates a flowchart defining a negative test requiring certain permissions in accordance with one embodiment of the present invention.

FIG. 8 illustrates a flowchart 500 defining a negative test requiring certain permissions in accordance with one embodiment of the present invention. It should be appreciated that the methodology described in flowchart 500 may be conducted independently of other positive or negative tests. In one embodiment, the method begins with operation 501 which determines if a security manager can be installed. If the security manager can be installed, the method advances to operation 400 which defines a method as described in reference to FIG. 7. If the security manager cannot be installed, the method proceeds to operation 502 which checks an existing security manager for the required permissions. After operation 502, the method advances to operation 504 which determines if the existing security manager grants permissions. If operation 504 determines that permissions are granted, the method moves to operation 506 which checks the existing security manager for the set of permissions to be denied. Then the method moves to operation 510 which determines if the existing security manager denies any permissions. If the existing security manager denies any permissions, the method proceeds to operation 512 which runs test under existing security manager and catches a security exception. After operation 512, the method advances to operation 516 which determines if a security exception is thrown. If operation 516 determines that the security exception is thrown, the method moves to operation 518 which returns failed status. If the security exception is not thrown as determined by operation 516, the method proceeds to operation 520 which returns status accordingly.

If operation 510 determines that any permissions are not denied, the method moves to operation 514 returns a passed status due to the inability to run the test. If operation 504 determines that permissions are not granted, the test is unable to be run and the method advances to operation 508 wherein a passed status is returned.

It should be appreciated that the framework and the different tests described herein may be embodied or written in any suitable type of code that can perform the operations as described herein.

It should be appreciated that the exemplary code described in the Tables herein use object oriented programming. An object is a generic term that is used in the object-oriented programming environment to refer to a module that contains related code and variables. A software application can be written using an object-oriented programming language whereby the program's functionality is implemented using objects. Examples of object-oriented programming languages include C++ as well as Java.

Object-oriented programming is a method of creating computer programs by combining certain fundamental building blocks, and creating relationships among and between the building blocks. The building blocks in object-oriented programming systems are called "objects." An object is a programming unit that groups together a data structure (instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction to the object to execute a certain method. It consists of a method selection (name) and a plurality of arguments that are sent to an object. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. A class defines a type of object that typically includes both instance variables and methods for the class. An object class is used to create a particular instance of an object. An instance of an object class includes the variables and methods defined for the class. Multiple instances of the same class can be created from an object class. Each instance that is created from the object class is said to be of the same type or class.

A hierarchy of classes can be defined such that an object class definition has one or more subclasses. A subclass inherits its parent's (and grandparent's etc.) definition. Each subclass in the hierarchy may add to or modify the behavior specified by its parent class.

To illustrate, an employee object class can include "name" and "salary" instance variables and a "set_salary" method. Instances of the employee object class can be created, or instantiated for each employee in an organization. Each object instance is said to be of type "employee." Each employee object instance includes the "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for compliance testing an implementation of a specification, comprising the operations of:
providing a class configured to vary a security environment of the implementation of the specification, the class including a security manager;
installing the class, wherein the installation of the class includes installing the security manager of the class;
configuring the class to vary the security environment corresponding to what a test requires, the configuring including constructing one or more security policies corresponding to the security environment that the test requires;
executing the test with the security manager of the class using the one or more security policies; and
restoring an original security environment after execution of the test,
wherein the configuration of the class varies with the used security policies associated with the security environment requirements of the test, in a single test run.

2. A method for testing an implementation of a specification as recited in claim 1, wherein the test may be one of a positive test, a negative test, a negative test requiring certain permissions, and a test designed to run positively and negatively.

3. A method for testing an implementation of a specification as recited in claim 2, wherein for the positive test, the security policy grants only required permissions to tests and grants default permissions to other code source, default permissions being permissions granted by an original security policy that has been replaced by the security policy.

4. A method for testing an implementation of a specification as recited in claim 3, wherein for the negative test, the security policy denies required permissions to test code source and grants default permissions to other code sources.

5. A method for testing an implementation of a specification as recited in claim 2, wherein the positive test includes,
   if a class cannot be installed,
      checking an existing security manager for required permissions,
      executing a test under the existing security manager when the existing security manager has required permissions,
      reporting a failure when the test throws a security exception, and
      returning a result of the test.

6. A method for testing an implementation of a specification as recited in claim 2, wherein the negative test includes,
   installing a security policy that is capable of denying a particular permission to test code source and granting all other code sources.

7. A method for testing an implementation of a specification as recited in claim 2, wherein the negative test includes,
   when the class cannot be installed,
      checking an existing security manager to determine whether required permissions are denied,
      executing the negative test when the existing security manager denies any of the permissions.

8. A method for compliance testing an implementation of a specification comprising:
   providing a test to a framework, the test configured to determine whether an implementation complies with a specification, wherein the framework includes a security manager, the security manager configured to use a particular security policy from a plurality of security policies for executing the test, the plurality of security policies constructed to vary the security environment to what the test requires; and
   running the test positively and negatively by changing the security policy defining the security environment for the test without modifying the test,
   wherein the security policy varies with the security requirements of the test in a single test run.

9. A method for testing an implementation of a specification as recited in claim 8, wherein running the test negatively includes denying required permissions to the test.

10. A method for testing an implementation of a specification as recited in claim 8, wherein running the test positively includes granting all required permissions to the test.

* * * * *